7. A method according to claim 5 in which the high polymeric substance is sprayed on in the form of a diluted aqueous dispersion, having a concentration of about 2 percent to about 5 percent by weight.

8. A method according to claim 5 in which a substantial amount of water is rained on the top layer of the soil, whereupon the high polymeric substance is sprayed on in the form of a comparatively concentrated aqueous dispersion, having a concentration of about 20 percent to about 30 percent by weight.

9. A method according to claim 1 in which the high polymeric substance is a water-insoluble polyvinyl compound capable of forming aqueous dispersions.

10. A method according to claim 9 in which the water-insoluble polyvinyl compound is a homopolymer or a copolymer of a vinyl ester of an aliphatic acid in the form of an aqueous dispersion.

11. A method according to claim 1 in which the high polymeric water-insoluble substance is used in conjunction with a water-soluble synthetic high polymer.

12. A method according to claim 11 in which the high polymeric substance consists of a mixture of a water-insoluble polyvinyl compound capable of forming aqueous dispersions and a water-soluble natural or synthetic high polymer.

13. A method according to claim 1 in which the high polymeric substance is a water-dispersible polysaccharide derivative.

14. A method according to claim 13 in which the high polymeric substance is a water-dispersible polysaccharide benzyl ether.

15. A method according to claim 13 in which the high polymeric substance is a water-dispersible starch ether.

16. A method according to claim 13 in which the high polymeric substance is a water-dispersible starch-vinyl graft copolymer.

17. A method according to claim 1 in which the surface of the top layer of the soil treated with the high polymeric substance is after compacting covered with a polyurethane, polyester, polyepoxy or polyacrylate polymer.

18. A method according to claim 1 in which the non-agricultural soil is a dike arranged around storage depots of combustible liquids.

19. A method according to claim 1 in which the high polymeric substance is homogeneously distributed through the soil to a depth of 2 to 6 inches.

* * * * *

INVENTOR
William A. Tam
BY Merriam, Marshall,
Shapiro & Klose
ATTYS.

STABLE OFFSHORE STRUCTURES

BACKGROUND OF THE INVENTION

This invention relates to stable offshore structures used in the production, storage and transportation of oil. More particularly, this invention is concerned with stable drilling platforms and mooring facilities adjacent to offshore oil wells and sub-surface oil storage tanks.

To meet the ever-increasing demands for petroleum products, the exploration for and production of oil has been extended from land to offshore locations. In the operation of offshore oil wells, substantial problems have been encountered in providing stable working areas above or on the water surface, and in facilitating transfer of oil from sub-surface tanks near the well sites to shoreline facilities. The complex and costly structures now in use have proven insufficiently stable and incapable of adequately withstanding severe weather conditions. This has been especially problematic when the structures are used for mooring purposes, since excursions and oscillations of the structures in long swells and high winds result in extremely large mooring loads and damaging interaction between the structures and moored vessels.

SUMMARY OF INVENTION

The present invention provides readily constructed, relatively economical structures capable of maintaining exceptional stability under all weather conditions. In accordance with the principles of the present invention, horizontally extending buoyant members in the form of platforms or tubular frames are provided which are pivotally interconnected by universal joint means with stationary sub-surface anchoring means by vertically extending buoyant tubular members or by link means. The buoyant members of the present invention are designed to utilize buoyant moments developed upon displacement to resist increasing displacement and effect restoration to normal position. It is further provided, according to the present invention, that the buoyant moments developed by the buoyant members may be tuned or altered by variable ballasting to maintain optimum stability in any weather or sea state.

In one aspect of the present invention, the stable off shore structure includes a horizontally extending buoyant member in the form of a platform supported at or above the water surface by one or more buoyant tubular members extending vertically downward from the platform toward stationary sub-surface anchoring means. Universal joint means are provided at the connection between the vertically extending tubular member or members and the platform as well as at the connection between the tubular member or members and the anchoring means. Provision may be made for attaching the vertically extending tubular member or members to the platform above the center of gravity of the platform so that substantial horizontal alignment of the platform is maintained at all times irrespective of the severity of deflection of the tubular member or members. When the platform is to be employed adjacent sub-surface storage tanks such as those shown in Stafford, et al., U.S. Pat. No. 3,429,128, the anchoring means may be a concrete ring wall around the tank, or some reinforced portion of the tank structure or frame. Provision may also be made for variably ballasting either the platform or the tubular member or members or both.

A stable offshore platform structure as described in the above aspect of the present invention may be employed as a platform from which drilling operations may be conducted or may be employed in a single point mooring system. Further, such stable offshore platform structures may be employed in multiple, with or without an interconnecting frame, as a breast mooring system.

In another aspect of the present invention, a stable offshore mooring structure is provided which includes a horizontally extending buoyant member in the form of a structural frame of large tubular members supported above the water surface by one or more buoyant tubular members extending vertically downward from the frame toward stationary sub-surface anchoring means. Universal joints are provided at the connection between the vertically extending tubular member or members and the structural frame as well as at the connection between the vertically extending tubular member or members and the anchoring means. Provision may also be made for variably ballasting the structural frame or the vertically extending tubular member or members, or both.

In operation, a tanker vessel connected to the stable offshore structure of the present invention imposes a mooring load upon the structural frame and the frame is deflected at some angle. A resisting and restoring moment is caused by counter-buoyant forces developed by the displacement of the center of buoyancy. This resisting and restoring moment, or spring constant, may be adjusted by variable ballasting of the vertically extending tubular member or members.

Furthermore, the spring constant of the system can be altered at will, even during loading or mooring operation, by either pumping suitable fluid into the buoyant structural frame and/or the vertically extending tubular members or by letting fluid flow out. This variable ballasting procedure permits not only adjustment of the spring constant but also adjustment of the period of oscillation of the system as a whole. In this manner, excursion may be reduced during storm conditions and interaction between the vessal and the mooring system is at all times minimized.

The mooring system, as described in the above aspect of the present invention, although resisting large mooring and wind loads, still allows concurrent movement of the tanker vessel and mooring frame which results in lower mooring loads imposed upon the vessel and therefore permits the vessel to be safely moored in higher sea states. Also, because the structural frame of the mooring system is located above the water surface and therefore above wave action, wave-induced loads are not as high as with other types of mooring systems. Additionally, when a preferred parallelogram or triangular frame configuration is utilized, the frame is not subject to pitch or roll during the mooring and loading process.

As will be more clearly shown in the drawings and the following detailed description, use of a mooring system as in the above aspect permits breast mooring of the entire tanker from bow to stern. The breast mooring system is highly advantageous in comparison to a bow mooring system when oil transfers take place because it reduces the length of oil supply hose necessary for transfer operations and permits the use of mechanical tanker loading or oil delivery arms.

In accordance with another aspect of the present invention, the structural frame and vertically extending tubular members or link means interconnecting the frame with the base means are provided so that the structural frame is floating at the water level in a neutral buoyancy position. In this aspect of the invention, a deviation from the normal position of the structural frame results in a larger resisting and restoring buoyant force since the entire structural frame is depressed deeper into the water during increasing displacement from the neutral buoyancy position.

BRIEF DESCRIPTION OF THE DRAWINGS

The invention will be better understood from the following detailed description thereof taken in conjunction with the accompanying drawings in which.

DESCRIPTION

Figure 1:
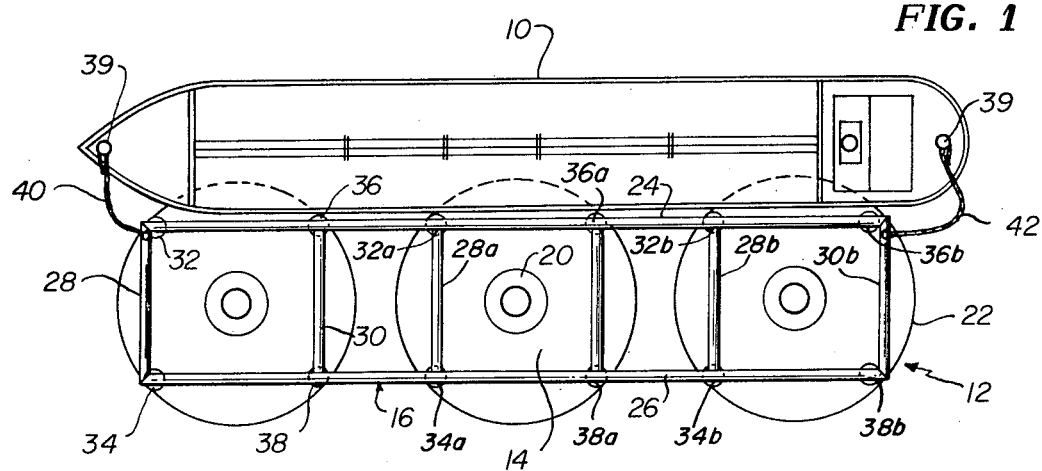
FIGS. 1 and 5 are plan views illustrating buoyant mooring structures constructed in accordance with the principles of the present invention and including a structural frame member which permits breast mooring of a tanker adjacent an offshore oil storage facility.
Figure 2:
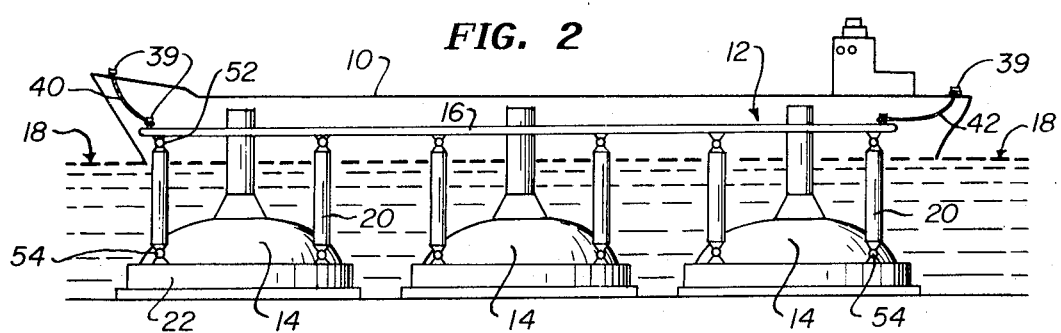
FIG. 2 is an elevational view illustrating one embodiment of the invention wherein the structural frame is supported above the water surface by a plurality of vertical buoyant tubular members interconnected with universal joint means between the structural frame and a concrete ringwall of an undersea storage chamber.

Referring to FIGS. 1 and 2, there is illustrated tanker 10 moored to buoyant mooring structure 12 adjacent a series of underwater storage chambers 14 at an offshore storage facility. Structure 12 includes horizontally extending buoyant structural frame 16 comprising large, substantially horizontally positioned tubular members, which, in this embodiment of the invention, are shown supported above the water surface 18 by a series of vertically extending buoyant tubular members 20. One end of each member 20 is connected by means of a universal joint to the concrete ringwall 22 positioned about the periphery of each underwater storage chamber 14.

Frame 16 includes a first elongated tubular member 24 shown adjacent vessal 10 and a second tubular member 26 spaced from and extending substantially parallel to member 24. In this embodiment members 24, 26 are normally positioned above the water line 18. A series of tubular transverse members 28, 30 interconnect the longitudinal members 24, 26 at the respective connection points 32, 34 and 36, 38. Transverse members 28a and 30a as well as 28b and 30b are likewise interconnected at points 32a, 34a, 36a, 38a and 32b, 34b, 36b and 38b, respectively.

The structural frame 16 may be provided with suitable ports 63 and/or valves 64 for taking on or discharging ballasting fluid. Similarly, vertical members 20 may be provided with ports 65 and/or valves 66 for variable ballasting.

Frame 16, in addition to supplying standard means (not shown) for transferring oil from storage chambers 14 to tanker 10, also has attached thereto mooring equipment 39 e.g., mounting ballards and mooring winches to allow mooring a tanker to the frame by means forward mooring line 40 and aft mooring line 42.

Figure 5:
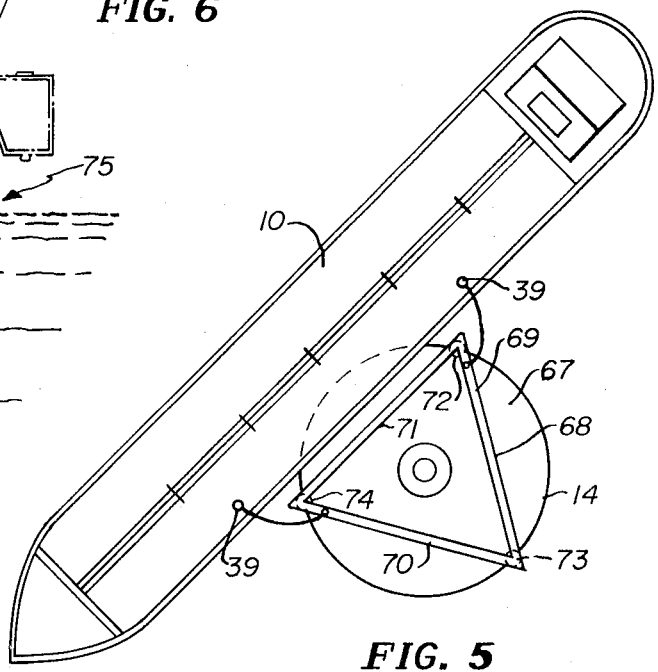

FIG. 5, illustrates the embodiment of the present invention as in FIG. 1 except that the buoyant mooring structure 67 located above the water surface and underwater storage chamber 14 includes a horizontally extending triangularly shaped structural frame 68. Frame 68 is supported, as in the embodiment of FIGS. 1 and 2, by vertically extending buoyant tubular members (not shown) which are in turn pivotally interconnected to the concrete ringwall 22.

The triangularly shaped buoyant structural frame 68 includes elongated tubular members 69, 70, 71 interconnected at connection points 72, 73, 74.

As in the embodiment shown in FIGS. 1 and 2, the triangularly shaped buoyant structural frame 68 and vertically extending tubular members may be suitably equipped with means for variably ballasting as well as with means for transferring oil from the storage chamber 14 to the tanker vessel 10 and with mooring equipment 39.

Figure 3:
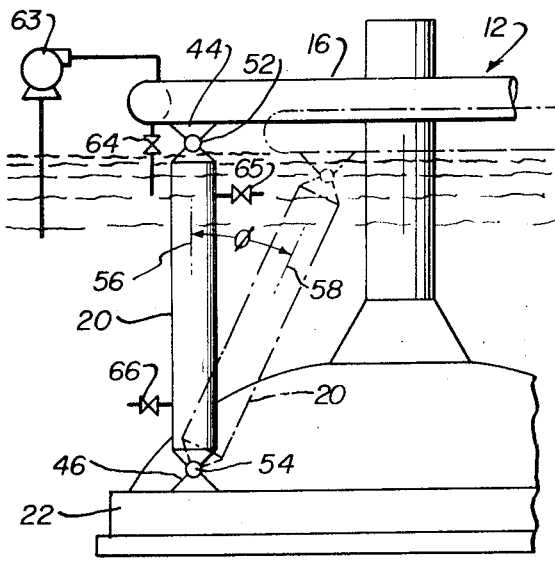
FIG. 3 is a fragmentary view of the embodiment of FIG. 2 in a normal position (above a storage chamber), the angular deviation of the vertical buoyant member during mooring loads illustrated in phantom lines.

In FIG. 3, the interconnection between the structural tubular frame 16 and the concrete ringwall 22 is illustrated in greater detail. Frame 16 incorporates a series of lugs 44 or other suitable means which preferably depend from the underside of respective tubular members of structural frame 16. Similar lugs or holding means 46 are located at concrete ringwall 22 and are normally disposed immediately below and substantially aligned with the lugs 44. Vertical buoyant tubular members 20 are pivotally interconnected at respective ends 48, 50 by suitable universal joint means or trunnion joint means 52, 54 to lugs 44, 46 respectively. As may be seen from FIGS. 2 and 3, vertical buoyant tubular members 20 are constructed with a predetermined length so that when they are in a normal position in the mooring system of the present invention frame 16 will lie in a substantial horizontal position above the level of the water surface 18.

Tanker 10 is moored by means of mooring lines 40, 42 to the frame 16 by means well known in the art. As the tanker is acted upon by high winds or long swells, a force generated by the mooring load (indicated by the reference arrow in FIG. 3), is imposed upon structure 12 such that it deflects through an angle $\phi$ as shown.

Angle φ is defined between the longitudinal center axis 56 of the vertical tubular member 20 in its neutral or normal vertical position and the displaced axis 58 as frame 16 is deflected under the mooring load. In accordance with the principles of the present invention, there is provided a resisting and restoring force due to the displacement of the center of buoyancy of the mooring structure 12 from its neutral or normal buoyancy position. The mooring structure thus provides a slight resisting and restoring force during light sea states and an increasing resisting and restoring force during higher sea states. Further, since mooring structure 12 is provided with means 63, 64, 65 and 66 for variable ballasting, the buoyant movements developed by the structure may be altered or "tuned" as desired so that excursions or movements of structure 12 in any mooring situation will correlate with excursions of the vessel 10, thereby allowing only a minimum of interaction between the vessel and the structure.

Figure 4:
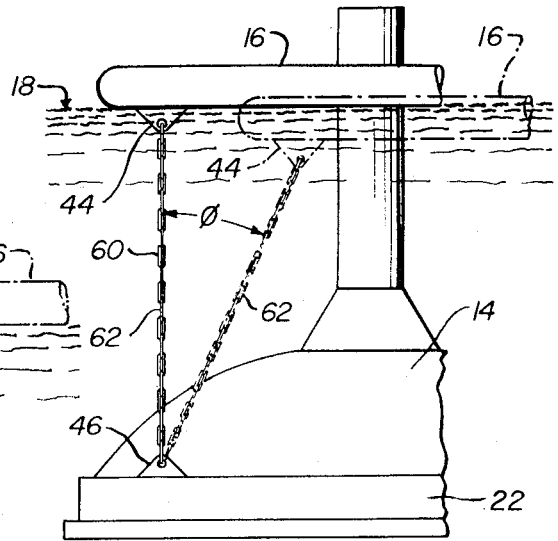
FIG. 4 is a fragmentary view illustrating an alternative embodiment of the invention incorporating a floating structural frame interconnected by linking chain means to the concrete ringwall of an undersea storage chamber.

FIG. 4 shows another embodiment of the buoyant mooring structure constructed in accordance with the principles of the present invention. Frame 16 in this figure is constructed as previously described with large, substantially parallel tubular members 24, 26, transverse members 28, 30 and variable ballasting means 63, 64. However, in accordance with this embodiment of the invention, frame 16 floats on the water surface 18, as opposed to being supported above the water surface as is the case with the embodiment of the invention illustrated in FIGS. 1-3. Moreover, this embodiment of the invention utilizes a vertical linking means, such as chain 60, which is suitably mounted to lug 44 of structural frame 16 and lug and lug 46 of concrete ringwall 22. It is to be understood, of course, that a plurality of chains 60 could be provided, if desired, to interconnect frame 16 to concrete ringwall 22 of each undersea storage chamber 14 in the same manner described for the vertical tubular members in the previously described embodiment of the invention.

When a force acts on this embodiment, the central axis 62 of chain 60 is deflected from a normal vertical position to the angle φ as indicated by the phantom lines shown in FIG. 4.

An advantage of the system shown in FIG. 4 is that upon increasing displacement of structural frame 16 (increasing angle φ) there results a larger resisting and restoring force. It is believed this occurs because structural frame 16, which in its normal position floats on the water surface 18 in neutral buoyancy position, is forced below the water surface as the mooring load increases. This results in an increasing buoyant resisting and restoring force to return frame 16 to its original neutral buoyancy position on the water surface. In other words, the more frame 16 is displaced by water, wind or mooring force, the greater is the force acting to return frame 16 to its original position.

Figure 6:
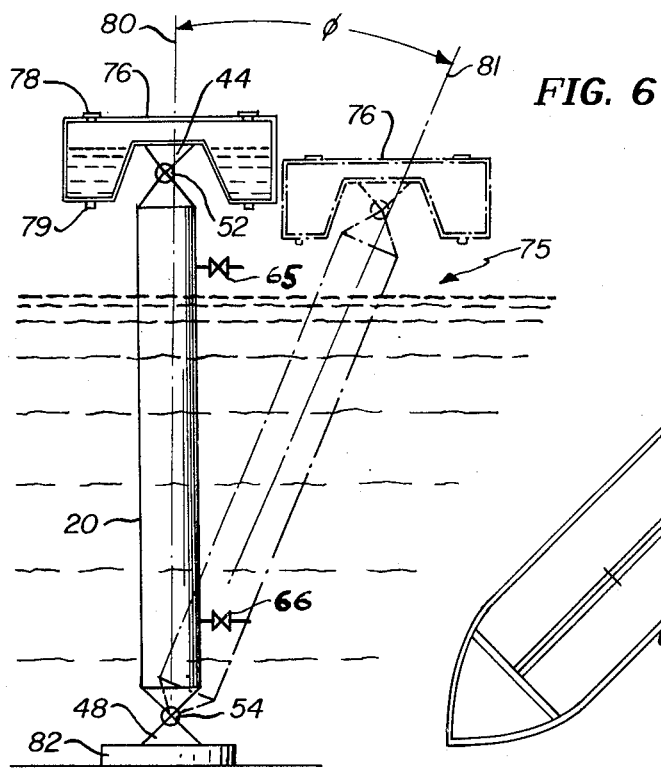
FIG. 6 is an elevational view of another embodiment of the invention wherein a horizontal buoyant member in the form of a platform is supported by and pivotally connected with a vertical buoyant member, the angular deviation from normal position shown in phantom lines.

Referring now to FIG. 6, there is illustrated a stable buoyant platform system 75 constructed according to the principles of the present invention wherein a horizontally extending buoyant member in the form of a platform 76 is pivotally interconnected with a vertically extending buoyant tubular member 20. The buoyant platform 76 is provided with a reservoir 77 for ballasting fluid as well as with suitable ports 78 and/or valves 79 for taking on or discharging ballasting fluid. Similarly, buoyant member 20 is provided with ports 65 and/or valves 66 for variable ballasting purposes.

Suitable stable anchoring means 82 are provided having firmly attached thereto lug 46 or other holding means to which one end of vertical buoyant tubular member 20 is pivotally interconnected by means of universal joint or trunnion joint means 54. The platform structure 76 is similarly provided with lug 44 on its underside in a position to permit the other end of the vertical buoyant tubular member 20 to be pivotally attached thereto by means of a universal joint means or trunnion joint means 52 at a point above the center of gravity of the platform structure 76. It is of course understood that an alternative embodiment of the invention as shown in FIG. 6 may employ the attachment of the lug 46 to the concrete ringwall or some reinforced portion of an underwater storage chamber.

A substantial advantage of the platform system 75 over the platform systems known in the art is seen to result from the attachment of the platform structure 76 with its center of gravity below the point of pivotal interconnection 52 with the vertical buoyant tubular member 20. During deflection of the vertical tubular member 20, for example through angle φ as defined between the longitudinal center axis 80 of vertical member 20 in its normal or neutral position and the displaced axis 81, the platform structure 76 will remain in a substantially horizontal plane.

Figure 7:
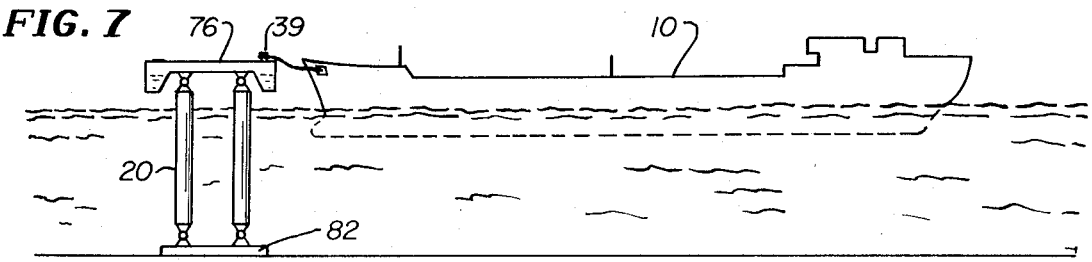
FIG. 7 is an elevational view showing another embodiment of the invention as in FIG. 5, wherein multiple vertical buoyant members support a platform in use as part of a single point mooring system.

Referring now to FIG. 7 there is illustrated a platform system similar to that shown in FIG. 6 but incorporating multiple vertical buoyant members 20 with the platform system in use as a part of a single point mooring system for a tanker vessel 10 and including standard mooring apparatus 39.

In using the mooring systems of FIGS. 6 and 7, the platform structure 76 is normally ballasted with water during the time when a tanker is not moored to the mooring system; however, once a connection is made with the tanker and a stiffer spring constant for the system is desired, water can be discharged until the desired spring constant for minimum excursion is reached.

Figure 8:
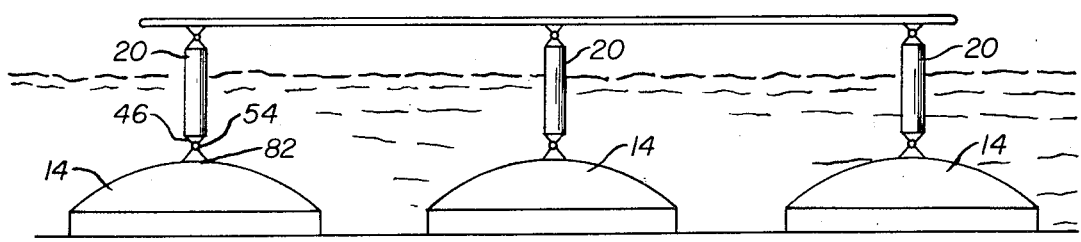
FIG. 8 is an elevational view of another embodiment of the invention wherein vertical buoyant members are mounted by universal joint means to a reinforced portion at or near the center of an undersea storage chamber.

In FIG. 8 there is illustrated an alternative embodiment of the systems heretofore discussed. In this embodiment, the vertical buoyant tubular member or members are pivotally attached by universal joint means 54 to lugs 46 mounted on some reinforced portion 82 at or near the center of an underwater storage chamber 14.

Obviously, many modifications and variations of the above-described invention may be made without departing from the spirit and scope thereof. As an example, the geometric configuration of the buoyant tubular frame or platform structure may be circular or some other shape. As a further example, multiple platform structures may be interconnected to form either an extended platform system or breast mooring system. Therefore, only such limitations as are indicated by the appended claims should be placed thereon.

What is claimed is:

1. A stable offshore structure comprising:
   a horizontally extending buoyant member;
   a stable anchoring means at the sea floor;
   means for supporting said horizontally extending buoyant member above the water's surface, said supporting means comprising at least three rigid vertically extending, variably ballastable, buoyant supporting members each having first and second ends; and, universal joint means for pivotally interconnecting each of said first ends of said support members to the horizontally extending member and each of said second ends of said support members to said anchoring means whereby said horizontally extending member is maintained in a substantially horizontal position during angular rotation of said support members from vertical position.

2. A structure as set forth in claim 1 wherein said horizontally extending member is variably ballastable.

3. A structure as set forth in claim 1 wherein said horizontally extending member has the form of a tubular frame.

4. A structure as set forth in claim 3 wherein said tubular frame is parallelogram-shaped.

5. A structure as set forth in claim 3 wherein said tubular frame is triangle-shaped.

6. A structure as set forth in claim 1 further including means for mooring a vessel adjacent said horizontally extending member.

7. A stable offshore structure comprising:

a horizontally extending, platform shaped, buoyant member;

a stable anchoring means at the sea floor;

means for supporting said horizontally extending member above the water's surface, said supporting means comprising at least one rigid vertically extending, variably ballastable buoyant support member, having first and second ends, and, universal joint means for pivotally interconnecting said first end of said support member to said horizontally extending member at a point above the center of gravity thereof, and said second end of said support member to said anchoring means, whereby said horizontally extending member is maintained in substantially horizontal position during angular rotation of said support member from vertical position.

8. A structure according to claim 7 wherein said horizontally extending member is variably ballastable.

9. A breast mooring system for mooring vessels adjacent an undersea storage facility including an undersea storage chamber having a ringwall contiguous thereto, said mooring system comprising:

a horizontally extending buoyant tubular frame member, disposed above and substantially superimposed over said storage facility;

means for mooring a vessel adjacent said frame member;

means for supporting said frame member above the water's surface, said supporting means comprising at least three rigid vertically extending, variably ballastable buoyant support members, each having first and second ends;

universal joint means for pivotally interconnecting each of said first ends of said support members to said frame member and each of said second ends to said ringwall, whereby said frame member is maintained in substantially horizontal position above said storage facility during angular rotation of said first ends of said support members.

10. A breast mooring system as set forth in claim 9 wherein said horizontally extending member is variably ballastable.

* * * * *